A. KINGSBURY.
BEARING.
APPLICATION FILED MAR. 3, 1913.
1,117,505.
Patented Nov. 17, 1914.
2 SHEETS—SHEET 1.
Fig. 1,
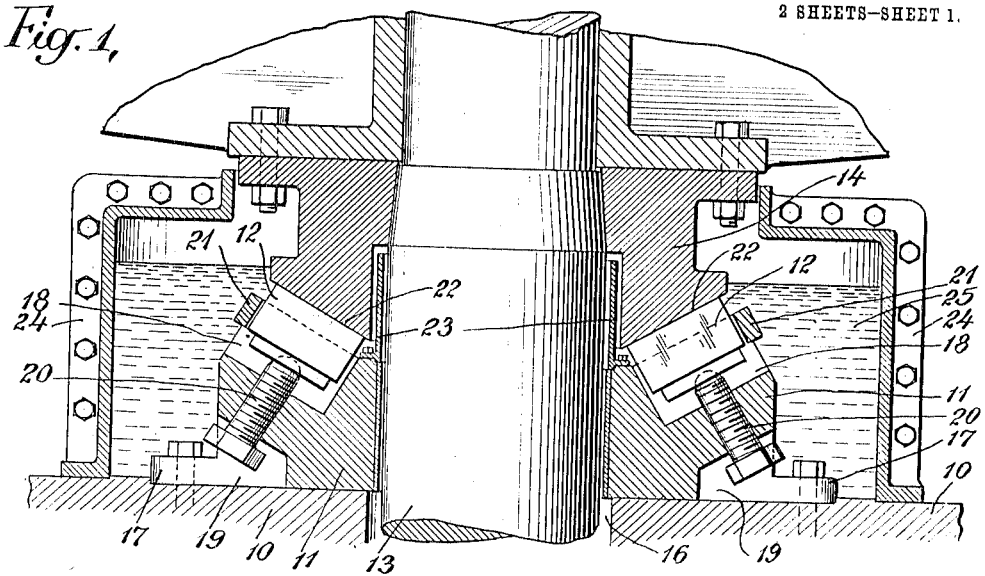
Fig. 2,
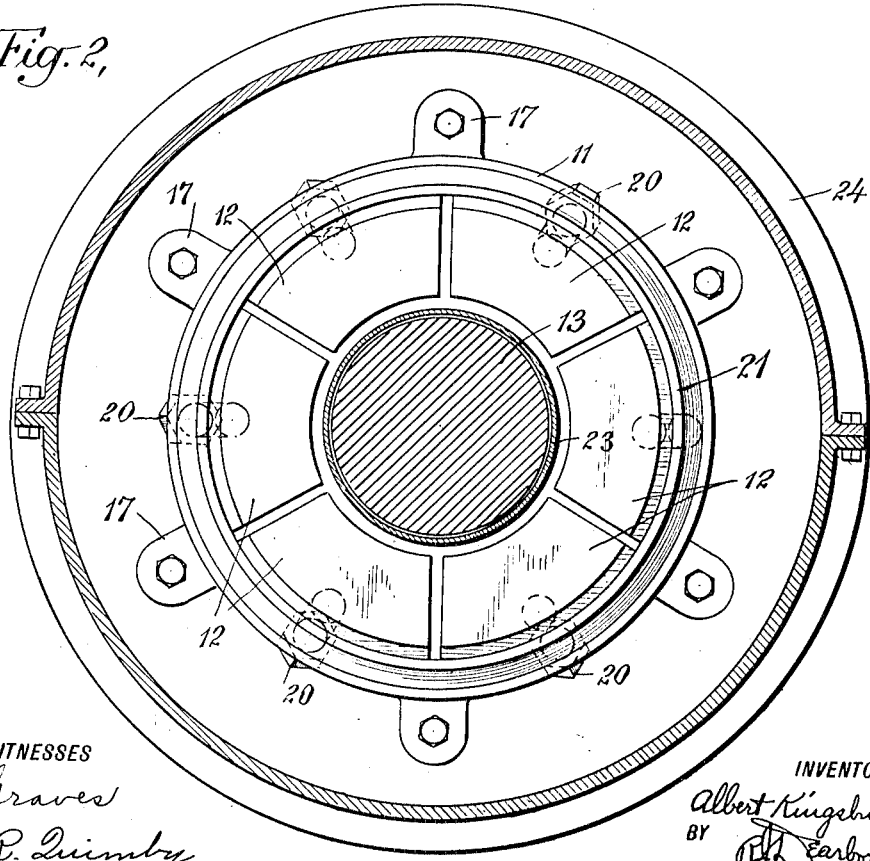
WITNESSES
F. Graves
G. R. Quimby
INVENTOR
Albert Kingsbury
BY
Earbour
ATTORNEY A. KINGSBURY.
BEARING.
APPLICATION FILED MAR. 3, 1913.
1,117,505.
Patented Nov. 17, 1914.
2 SHEETS—SHEET 2.
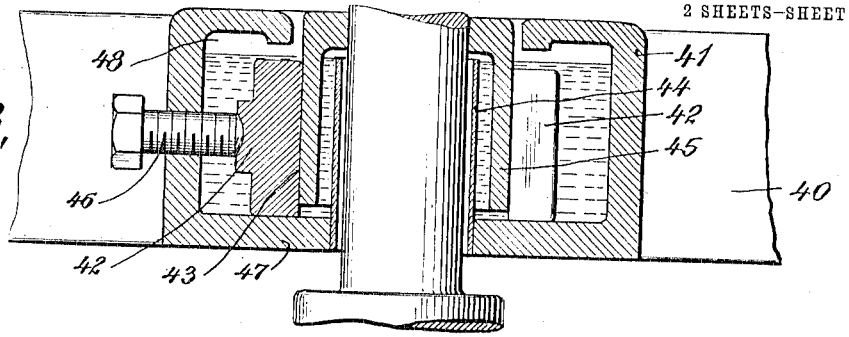
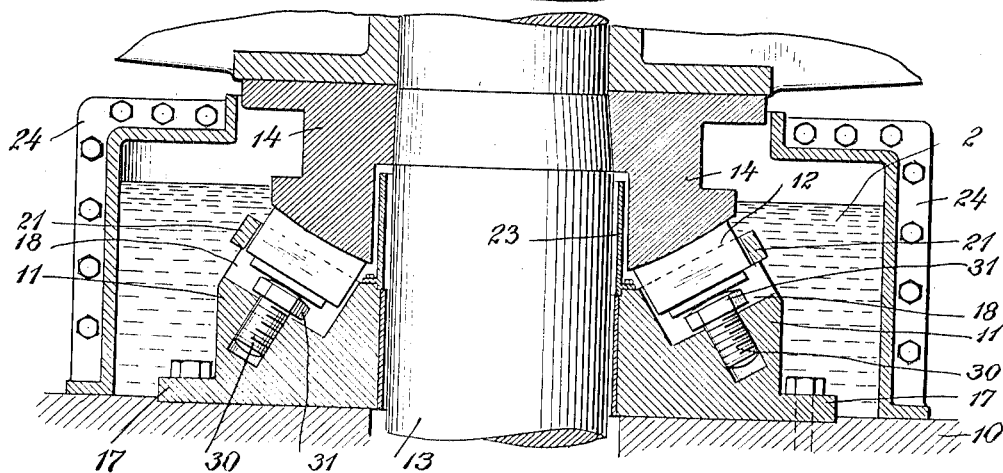
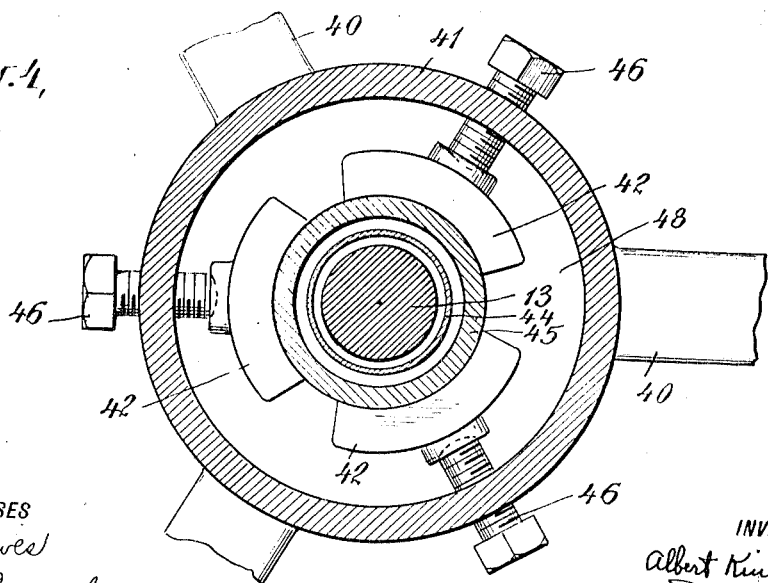
WITNESSES
F. Graves
G. R. Quimby
INVENTOR
Albert Kingsbury
BY
ATTORNEY

UNITED STATES PATENT OFFICE.

ALBERT KINGSBURY, OF PITTSBURGH, PENNSYLVANIA.

BEARING.

1,117,505.   Specification of Letters Patent.   Patented Nov. 17, 1914.

Continuation in part of application Serial No. 710,495, filed July 19, 1912. This application filed March 3, 1913. Serial No. 751,737.

*To all whom it may concern:*

Be it known that I, ALBERT KINGSBURY, a citizen of the United States, and a resident of Pittsburgh, in the county of Allegheny and State of Pennsylvania, have invented certain new and useful Improvements in Bearings, of which the following is a specification, reference being had to the accompanying drawings, forming a part thereof.

In Patent No. 947,242 granted January 25th, 1910 on an application filed by me on May 20, 1907, I have shown and described a thrust bearing comprising a plurality of radial shoes which have plane contact surfaces and are arranged to automatically maintain a film of lubricating fluid between the coöperating bearing surfaces.

My present invention relates to fluid lubricated bearings of the same general character and its object is to provide a simple and efficient bearing of the shoe type that shall automatically maintain a film of lubrication between curved bearing surfaces.

Other objects of my invention will be set forth hereinafter.

I will describe my invention in the following specification and point out the novel features thereof in appended claims.

Referring to the drawings: Figure 1 is a sectional elevation of a combined guide and thrust bearing constructed in accordance with my invention. Fig. 2 is a plan view of the bearing of Fig. 1, the rotatable member being broken away to more fully disclose the relatively stationary parts. Fig. 3 is a view corresponding to Fig. 1 of a structure comprising a guide bearing and a modified form of combined guide and thrust bearing both embodying my invention. Fig. 4 is a plan view of the guide bearing of Fig. 3.

Like characters of reference designate corresponding parts in all the figures. The bearing of Figs. 1 and 2 comprises a relatively stationary base 10, an annular supporting member 11, a plurality of radial shoes 12 and a rotatable shaft 13 having a bearing collar 14. The base has a central opening 16 through which the shaft 13 extends although the shaft may terminate above the base, the direction in which it extends depending entirely upon the position of the load relative to the bearing.

The annular supporting member 11 loosely surrounds the shaft 13 and has radial lugs 17 by which it is bolted to the base. It has a series of notches 18 in its top surface, which is preferably curved to follow in general the contour of the opposed surface of the collar although it is spaced from it as hereinafter explained. The bottom outer edge of the supporting member 11 is also notched to provide recesses 19 respectively located below the notches 18. One of the bearing shoes is disposed in each of the notches 18 and is tiltingly mounted on a bolt 20, the head of the bolt being exposed in the recess 19 and thus accessible for an adjusting wrench, (not shown). The shoes have the general form of ring segments as shown in Fig. 2 and fit loosely into the notches 18 which have approximately the same shape. A ring 21 is secured to the supporting member at its top outer edge and assists in holding the shoes against rotation. The collar 14 may be secured to the shaft 13 in any suitable manner or in fact it may form a part of the shaft. It has a convex conically curved bearing surface 22 which is engaged by correspondingly curved concave surfaces of the shoes 12. The supporting member has a flange 23 which is overhung by the lower part of the collar 14 and a casing 24 surrounds the bearing and is secured to the base 10 thereby providing an annular oil well or channel 25. Oil is preferably maintained at such a level as to immerse the bearing surfaces. The mounting of the shoes is such that they are free to assume a slightly tilted position in operating under the wedging action of the oil between the bearing surfaces and therefore an oil film is automatically established and maintained.

The arrangement of parts and the inclination and curvature of the bearing surfaces is such that a large thrust load may be sustained without injury to the bearing and at the same time the bearing serves to guide the shaft and to render a guide bearing at this point unnecessary. It is also evident that the load is automatically distributed and equalized on the several shoes. The inclination of the shaft may be adjusted by turning the bolts 20 to raise the shoes on one side of the shaft and lower them on the other and the vertical position of the shaft and its load may be adjusted by suitably turning all of the bolts. It is thus evident that the bearing is not only capable of readily adjustment but is inherently a self adjusting structure.

Referring to Figs. 3 and 4, the combined guide and thrust bearing here shown is similar to that of Figs. 1 and 2 and need not be described in detail. The bearing surface of the collar 14 is however spherically curved and the engaging surfaces of the shoes 12 are correspondingly curved. The same arrangement of supporting bolts may be employed, or bolts 30 having spherically curved heads 31 may be screwed into tapped holes in the supporting member 11 as shown in Fig. 3. The guide and thrust bearing of my invention may be used to advantage on vertical turbines and for various purposes but since the load is not a part of the invention it has been omitted from the drawings.

In Figs. 3 and 4 I have also shown a modification of my invention adapted for use as a guide bearing. A stationary support 40 of this structure has a central hub 41 of channel shape in which a plurality of shoes 42 are supported. The shaft 13 has a collar 45 which overhangs a flange 44 of the hub 41. The outer cylindrical surface of the collar is in contact with the correspondingly curved inner surfaces 43 of the shoes. Each of the shoes is tiltably supported in opposition to the pressure on its bearing surface by means of a bolt 46 on which it is seated. The bolts are screwed through the walls of the hub 41 and have spherically curved ends which engage shallow recesses in the shoes. The weight of the shoes is sustained by a ledge 47 of the hub but there is no material pressure between the shoes and the ledge and the shoes are free to tilt in a transverse plane to produce and maintain an oil film between the cylindrically curved surfaces of the bearing. The annular space 48 within the hub channel constitutes an oil well so that the bearing surfaces may be immersed as shown in the drawings. By adjusting the bolts 46 the position of the shaft may be changed and thus its proper alinement may easily be secured and maintained. The guide bearing is particularly well adapted for use with the self adjusting guide and thrust bearings shown and described herein although its use is not limited to this arrangement. The guide bearing of Figs. 3 and 4 may readily be adapted for use as a substitute for an ordinary horizontal shaft bearing and various structural modifications of my invention will suggest themselves to those skilled in the art. I therefore intend that only such limitations be imposed as are indicated in the appended claims.

This application is in part a continuation of my co-pending application, Serial No. 710,495, filed July 19, 1912, the broad claims of this application being clearly readable upon the structure disclosed in the aforesaid application.

What I claim is:

1. A bearing comprising a relatively rotatable member having a curved annular bearing surface; and a plurality of tiltably supported bearing shoes, with axes at an acute angle to the axis of said relatively rotatable member and having curved bearing surfaces adapted to coöperate with said annular bearing surface so as to center and oppose the axial thrust of the rotatable member.

2. A bearing comprising a relatively rotatable member having a curved annular bearing surface; and a plurality of adjustably and tiltably supported bearing shoes, with axes at an acute angle to the axis of said relatively rotatable member and having curved bearing surfaces adapted to coöperate with said annular bearing surface so as to center and oppose the axial thrust of the rotatable member.

3. A bearing comprising a relatively rotatable member having a conically curved annular bearing surface; and a plurality of tiltably supported bearing shoes, with axes at an angle to the axis of said relatively rotatable member and having conically curved bearing surfaces adapted to coöperate with said annular bearing surface so as to center and oppose the axial thrust of the rotatable member.

4. A bearing comprising a relatively stationary supporting member, a plurality of shoes tiltably supported thereon with inclined axes and having concave curved bearing surfaces and a relatively rotatable bearing member, having a convex curved surface, adapted to be seated on said shoes so as to center and oppose the axial thrust of the rotatable member.

5. A bearing comprising a relatively stationary supporting member, a plurality of shoes tiltably supported thereon, with inwardly inclined axes and having concave conically curved bearing surfaces and a relatively rotatable bearing member, having a convex conically curved surface, adapted to be seated on said shoes.

6. A bearing comprising a relatively stationary supporting member having a central opening, a relatively rotatable shaft extending therethrough, a flange on the supporting member surrounding the shaft, a collar secured to the shaft and overhanging the flange of the support and having a curved bearing surface, bearing shoes tiltably mounted on said supporting member with converging inclined axes and having curved bearing surfaces with which the curved bearing surface of the collar coöperates whereby the shaft is centered and its axial thrust opposed.

7. A bearing comprising a relatively stationary supporting member having a central opening, a relatively rotatable shaft extending therethrough, a flange on the supporting member surrounding the shaft, a collar secured to the shaft and overhanging the flange of the support and having a conically curved bearing surface, bearing shoes tiltably mounted on said supporting member with axes at an angle to the axis of the shaft and having conically curved bearing surfaces with which the curved bearing surface of the collar coöperates.

8. A bearing comprising a relatively stationary supporting member having a central opening, a relatively rotatable shaft extending therethrough, a flange on the supporting member surrounding the shaft, a collar secured to the shaft and overhanging the flange of the support and having a conically curved bearing surface, bearing shoes tiltably mounted on said supporting member with axes at an angle to the axis of the shaft and having conically curved bearing surfaces with which the curved bearing surface of the collar coöperates, and means forming with said flange an oil well in which the shoes are disposed and into which the shaft collar extends.

9. A bearing comprising an annular supporting member having a plurality of radial notches, bolts, adjustably mounted in the supporting member and extending into the several notches, shoes tiltably mounted on the bolts in the notches with their axes inwardly inclined, and a relatively rotatable member extending through the annular supporting member and having a conically curved bearing surface adapted to coöperate with the bearing surfaces of the shoes.

In witness whereof, I have hereunto set my hand this 26th day of February, 1913.

ALBERT KINGSBURY.

Witnesses:
B. B. Hines,
M. C. Merz.